United States Patent [19]

Grimbleby et al.

[11] Patent Number: 4,510,384

[45] Date of Patent: Apr. 9, 1985

[54] AUTOMATIC FOCUSING DEVICE WITH FREQUENCY WEIGHTED AMPLIFICATION

[75] Inventors: James B. Grimbleby, Reading; Christopher G. Talbot, Cheltenham, both of England

[73] Assignee: National Research Development Corporation, London, England

[21] Appl. No.: 408,282

[22] Filed: Aug. 16, 1982

[30] Foreign Application Priority Data

Aug. 17, 1981 [GB] United Kingdom ............... 8125084

[51] Int. Cl.³ .............................................. G01J 1/20
[52] U.S. Cl. .................................... 250/201; 250/204
[58] Field of Search .................. 250/201 PF, 201 AF, 250/204; 356/1, 4; 354/402

[56] References Cited

U.S. PATENT DOCUMENTS 4,155,004  5/1979  Schulz ................................. 250/204
4,336,450  6/1982  Utagawa et al. .................... 250/201

FOREIGN PATENT DOCUMENTS 1239126  7/1971  United Kingdom .

*Primary Examiner*—David C. Nelms
*Assistant Examiner*—Jere J. Brophy
*Attorney, Agent, or Firm*—Cushman, Darby & Cushman

[57] ABSTRACT

An optical system is automatically focussed by deriving an electrical signal which has a frequency distribution corresponding to the spatial frequency distribution of an image received from a focussing lens; applying to the electrical signal an amplification which is greater at high frequencies than at low frequencies; and adjusting the optical system to maximize the amplified signal.

10 Claims, 4 Drawing Figures

AUTOMATIC FOCUSING DEVICE WITH FREQUENCY WEIGHTED AMPLIFICATION

This invention relates to an automatic focusing device in which the sharpness of an image is sensed and the sensed information used to correct a focusing means.

Automatic focusing devices based on distance measurement or on two-channel edge-sensing devices using correlation techniques are known, but may not always be appropriate, for example in medical applications. A single channel device which senses image sharpness is described in the specification of UK Pat. No. 1239126, but a low frequency cut-off must be present; since the frequency content of an image is often unknown, especially in medical applications, it may be impracticable to choose an appropriate cut-off value.

According to the invention, a method of focusing an optical system comprises receiving an image from a focusing means; providing an electrical signal having a frequency distribution which corresponds to the spatial frequency distribution of said image; applying to the electrical signal an amplification which is greater at high frequencies than at low frequencies, and adjusting the optical system in accordance with the amplified signal.

Also according to the invention, focusing apparatus for focusing an optical system comprises receiving means for receiving an image from a focusing means; circuit means for deriving from the receiving means an electrical signal having a frequency distribution which corresponds to the spatial frequency distribution of said image; amplification means for applying to the electrical signal an amplification which is greater at high frequencies than at low frequencies; and adjusting means for adjusting the optical system in accordance with the amplified signal. Preferably the amplification means applies an amplification which is proportional to frequency.

The receiving means may be an array of photosensitive detectors which is scanned to produce a signal in accordance with the intensity of light incident on the array. These may be eight detectors, but preferably there are many detectors, such as 256, in the array.

The invention will now be described by way of example only with reference to the accompanying drawings in which.

Any optical system including an automatic focusing system can be characterized by its optical transfer function, which is defined as follows. If a test object consists of a grating having sinusoidal variation of intensity about a mean, the image of the object will also be a sinusoidal variation of intensity about a mean. The sinewave grating can be specified by its spatial frequency, either in lines per millimeter or in "Reduced Form" by a variable S where S=2 is the limit of resolution. The contrast C of the grating is given by C=b/a, where a=mean intensity and b=amplitude of the sinusoidal modulation of intensity. Similarly, the image contrast is defined as C'=b'/a', and the contrast transfer function as D=C'/C, which is always less than 1. The variation of contrast transfer function with spatial frequency characterises the performance of a lens system.

Figure 1:
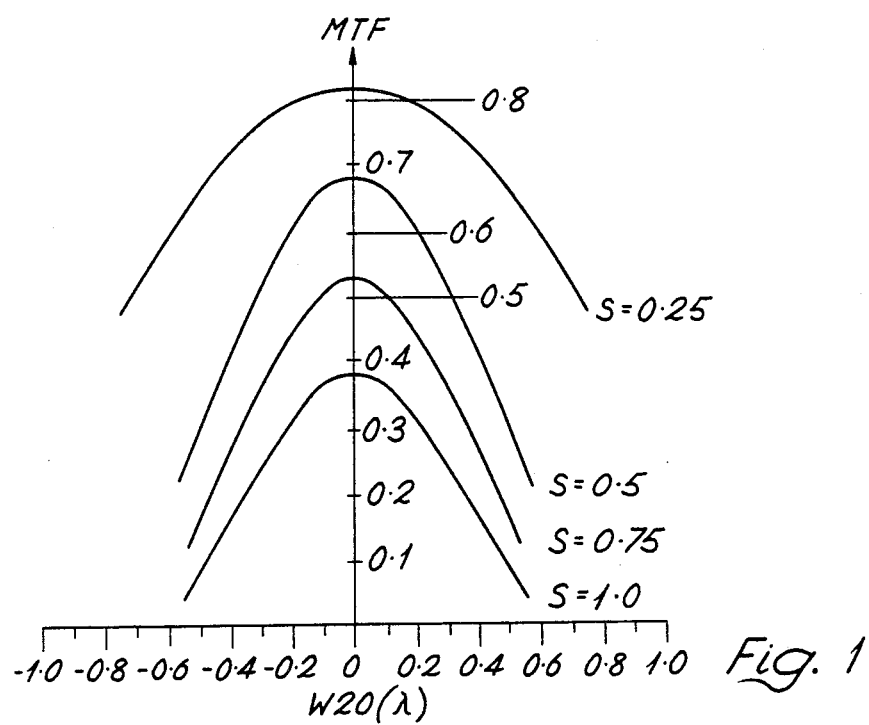
FIG. 1 illustrates ideal defocus transfer functions at four different spatial frequencies.

In the present invention, the behaviour of the contrast transfer function in defocused systems has been studied, and the automatic focusing system designed accordingly. It has been found that for any spatial frequency S, the value of D is reduced by focus error. In FIG. 1, contrast transfer function is plotted against focus error in wavelengths W20($\lambda$) for four different values of S. It will be seen that when S is low e.g. 0.25, the transfer function has a high value and a wide spread, while when S is high e.g. 1.0, the value of the transfer function is lower and the curve is narrower. The result is that for high spatial frequencies the range of tolerable defocus is much narrower than it is for low spatial frequencies.

In a natural object, the highest spatial frequency cannot easily be predicted, and since higher spatial frequencies are often generated by sharp edges, their amplitude will be small. In the method and apparatus according to the invention the characteristics of the amplifying device to which all spatial frequencies are supplied is such that the highest frequency present is amplified by the greatest amount, so that precise focusing of the highest frequency contribution is possible.

Further, a real optical system will always have aberrations which cause different spatial frequencies to focus in slightly different focal planes. The best focal plane for a natural object will always be a compromise, so that it is important to have amplitude information about all frequencies in the focusing signal, but to strike a reasonable balance by giving higher spatial frequencies a heavier weighting (greater amplification) than lower frequencies.

An application of the invention will now be described.

Figure 2:
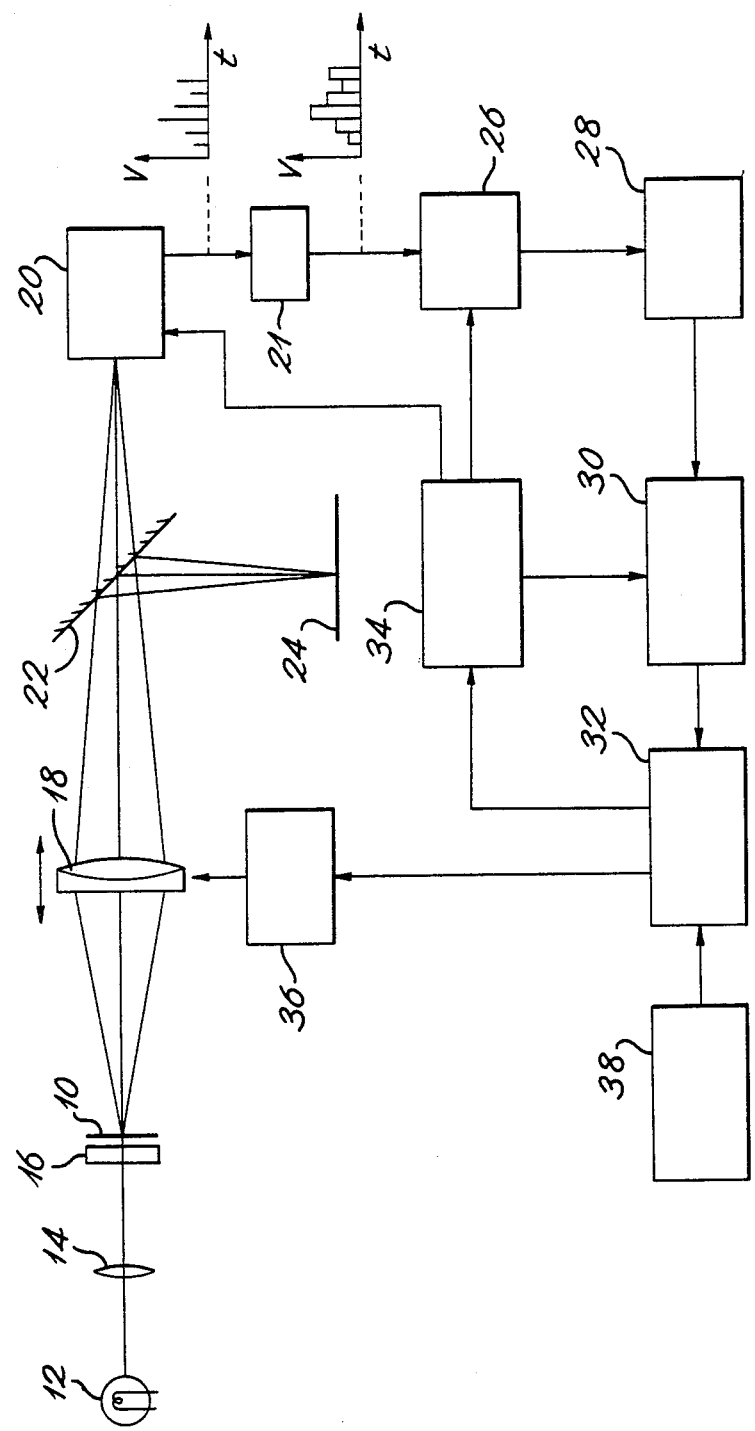
FIG. 2 illustrates the optical and electronic parts of an automatic focusing system according to the invention.

In FIG. 2 an object 10 is illuminated by a light source 12 through a condenser lens 14 and a sheet of heat-absorbing glass 16. Light transmitted by the object 10 passes to an objective lens system 18 which can be moved along its axis as indicated by the double headed arrow. The lens system 18 focuses light from the object onto a linear photodiode array 20, but part of that light is deflected by a beam splitter 22 to a photographic film 24, also at a focus of lens system 18.

The diode array 20 is connected through a boxcar circuit 21, a filter 26, a full wave rectifier 28 and an integrating analogue-to-digital converter (ADC) 30 to microprocessor 32. The microprocessor directs a control and clock circuit 34 which supplies signals to the array 20, the filter 26 and the converter 30. The microprocessor controls a stepper motor assembly 36 which supports the lens system 18 and provides the axial movement, and the microprocessor is itself supplied with a focusing algorithm by a store 38.

It has been found that it is not necessary to make the diode centre-to-centre frequency greater than S=0.5 which means that the greatest spatial frequency detected will be S≦0.25. No significant loss of accuracy occurs because the defocus tolerance at this frequency is not significantly different from that at S=1.

In operation, light from different parts of the object is focused on different photodiodes in the array 20. The array is scanned under the control of circuit 34, and the output, (illustrated in FIG. 2 at the appropriate position), is supplied to the boxcar circuit 21. This circuit broadens each pulse to give a boxcar signal, also illustrated in FIG. 2, and feeds the signal to the filter 26.

Figure 3:
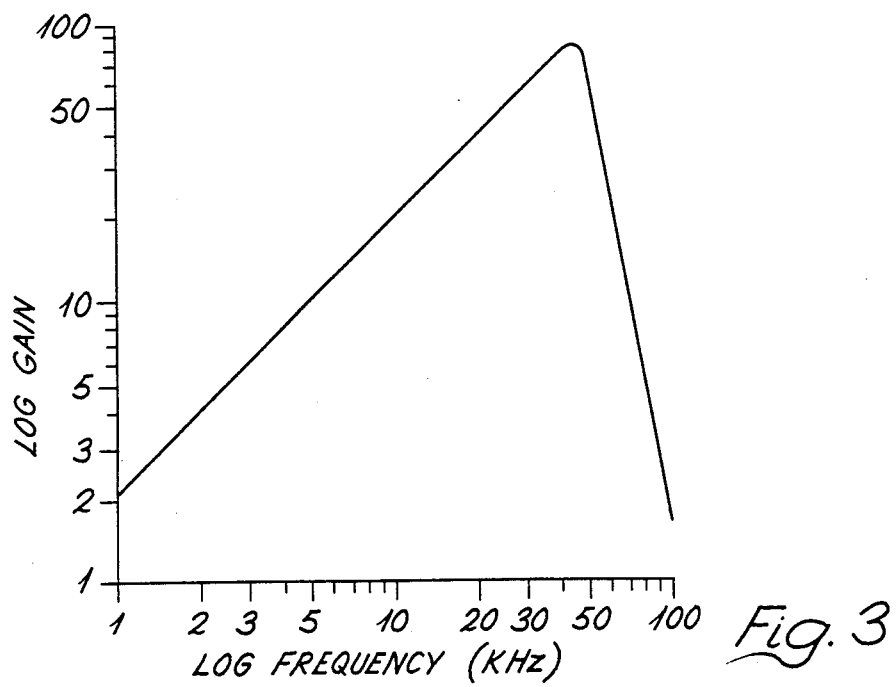
FIG. 3 illustrates the idealised frequency response of the filter in FIG. 2.

The frequency response of the filter is illustrated in FIG. 3, which is a plot of log (gain) against log (frequency in kilohertz). The amplification applied to the input signal varies directly with frequency so that high frequency signals are amplified much more than low frequency signals. The output of the filter 26 thus has a component derived from the highest spatial frequency detected by the diode array. The remainder of the circuit operates to adjust the position of the lens 18 until the signal from filter 26 is a maximum. When the image is out of focus, the output signal will be provided by low frequency components of the image. As a precise focus is approached, higher frequencies start to appear in the signal and are amplified by a greater amount than lower frequencies, so that focusing becomes more and more accurate by reason of the characteristic of the amplification circuit.

Looked at from another point of view, the best focal plane for the lens system 18 contains the maximum amount of information about the object, which implies a maximum amount of variation in the signal. A measure of the variation of a function is given by differentiating it. An electronic signal can be differentiated by passing it through a filter whose frequency response is proportional to frequency. This is characteristic of the amplification means used in the present invention.

The upper cut-off point of the filter is sharp and is at half the scan frequency of the photodiode array 20; this reduces the effect of any fixed pattern noise caused by the individual photodiodes having different responses.

It will be clear that the higher the number of photodiodes in the array 20, the more precisely a position of best focus can be determined. While it is possible to provide a "differentiated" signal from an array of two photodiodes, in practical situations at least eight will be required and preferably a much larger number such as 256 or even over 1000. The array may be linear or two-dimensional. Usually the lens system 18 and the diode array 20 will be laterally fixed and the array 20 will be scanned electronically, but mechanical scanning of a single diode is also possible.

Considering now in more detail the arrangements for moving the lens system 18 to give a precise focus, the output from filter 26 is full wave rectified, averaged by ADC 30 over a period corresponding to one scan of the photodiode array 20, and converted to a digital number which is read into the microprocessor 32. The ADC is switched off at the beginning of the scan to remove the impulse caused by the discontinuity between the end of one scan and the beginning of the next. The microprocessor 32 implements the algorithm in store 38 and moves the lens 18 by means of the stepper motor 36.

There are two possible types of algorithm.

In the first type, suitable for use with conventional still photography and operable by manually closing a switch, the algorithm in store 38 causes the microprocessor 32 to control stepper motor 36 so that the lens system 18 is swept through a reasonable range of positions. The microprocessor determines the position of best focus, corresponding to a maximum signal from the ADC 30, and returns the lens system to this position before the photograph is taken. Clearly, the lens system must be moved quickly.

In a second type of algorithm intended for use with a video, television or cinematic camera, the lens system 18 is moved to track continuously the focus position of a moving object. The lens system is moved in one direction until the signal from the ADC 30 is, for example, 10% lower than the maximum signal detected during this direction of movement, then the direction of travel is reversed and the calculation repeated. The lens system 18 must be able to move at least twice as fast as movement of the object, and the effect is that the system moves backwards and forwards through the best focus, but this oscillation will not be detectable by the human eye, which (a) is a less accurate detector of focus and (b) has its own focal compensating tremor. If there is no object, the lens system can be tracked between two predetermined points and, if required, a subroutine can be included to stop the lens at the position corresponding to the most recent signal maximum, so that a still photograph can be taken.

Both algorithms can be linked to subroutines to control the aperture and shutter speed of a recording camera.

If there is a possibility of two objects at different distances but of similar size in the image, the problem is overcome by arranging the photodiode array 20 to cover a small area in the centre of the image plane, and to include a failsafe in the algorithm to move the lens system to focus on the nearer object.

Figure 4:
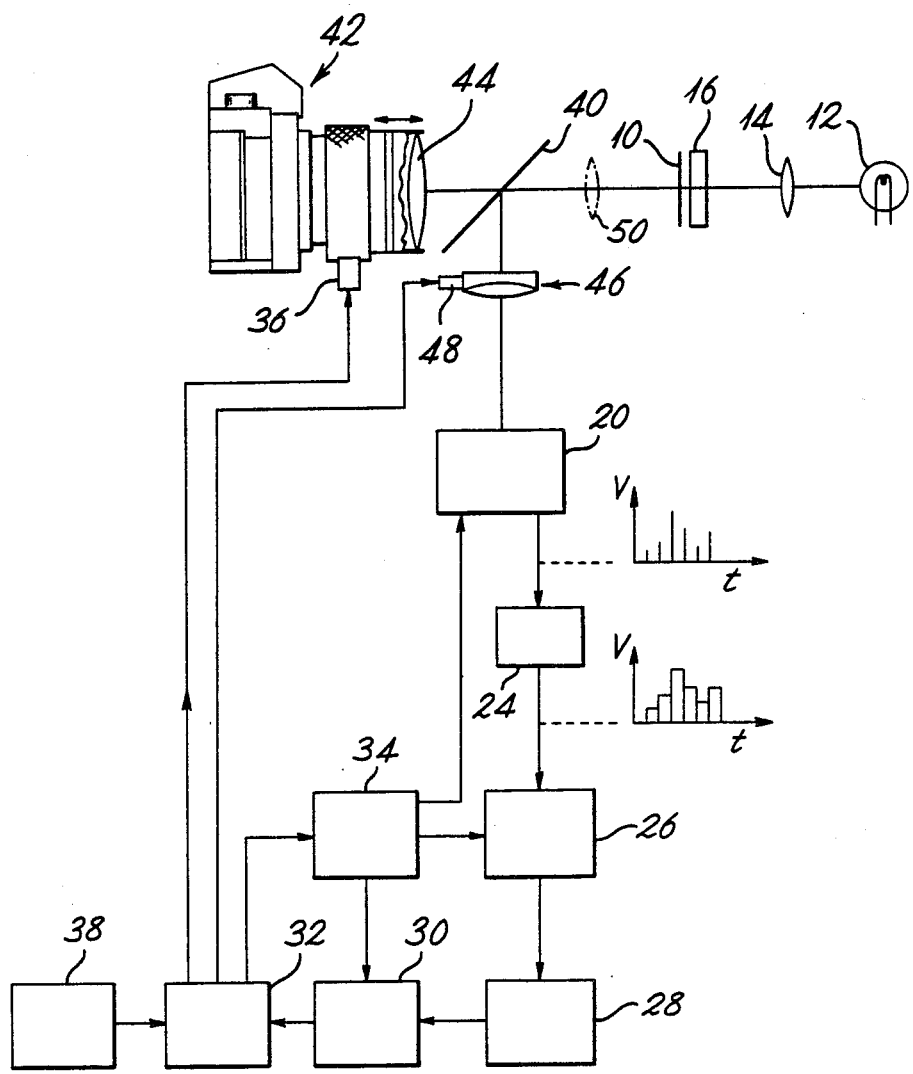
FIG. 4 illustrates an alternative to the FIG. 2 system.

FIG. 4 illustrates an alternative arrangement; items identical to FIG. 2 are given the same reference numerals. Light transmitted through the object 10 is received by a semireflecting surface 40 which transmits part of the light to a camera 42 having a lens 44, and reflects the remainder of the light through a further lens system 46 to the photodiode array 20. The stepper motor assembly 36 controls the position of the lens system 46, sweeping it continuously through a full range of possible positions. The microprocessor 32 controls a further stepper motor 48 which moves the camera lens 48, keeping it in the position of best focus as determined from the swept lens system 46. There may be a further optical system between the semi-reflecting surface 40 and the object indicated schematically as reference 50. For example, an optical instrument such as an endoscope may be placed at this position.

FIGS. 2 and 4 illustrate the invention when embodied in a transmission arrangement for exposing a photographic film; the invention can also be applied to reflecting arrangements, or for exposing any type of recording system, such as a television camera or video recorder, or can be used in a scientific or industrial instrument such as an endoscope. It can also be used to set accurately or to calibrate optical systems.

In a very simple version of the inventive apparatus, not illustrated, the output of the filter is supplied to a rectifier and a meter, and an observer sets the position of a lens in accordance with the maximum meter reading. This arrangement may be used to adjust optical instruments during manufacture.

We claim:

1. A method of focusing an optical system comprises receiving an image from the focusing means; providing an electrical signal having a frequency distribution which corresponds to the spatial frequency distribution of said image; applying to the electrical signal an amplification which is greater at high frequencies than at low frequencies; and adjusting the optical system in accordance with variations in the amplified signal.

2. A method according to claim 1 in which the amplification applied to the electrical signal is proportional to frequency.

3. A method of focusing an optical system according to claim 1 wherein said adjusting of the optical system includes responding to an amplified signal component derived from the highest optical frequency of said distribution to increase the proportion of high frequency components in the said electrical signal.

4. Focusing apparatus for focusing an optical system comprises receiving means for receiving an image from a focusing means; circuit means for deriving from the receiving means an electrical signal having a frequency distribution which corresponds to the spatial frequency disribution of said image; amplification means for applying to the electrical signal an amplification which is greater at high frequencies than at low frequencies; and adjusting means for adjusting the optical system in accordance with variations in the amplified signal.

5. Focusing apparatus according to claim 4 in which the amplification means applies an amplification which is proportional to frequency.

6. Focusing apparatus according to claim 4 in which the receiving means comprises an array of at least eight photosensitive detectors which each respond in accordance with the intensity of incident light; and the circuit means comprises scanning means arranged to scan said detector array.

7. Apparatus according to claim 4 in which the focusing means is a part of the optical system to be focused, and in which the adjusting means adjusts the focusing means through a predetermined focal range, there being further provided signal storage and comparison means to determine the position of the focusing means at which a maximum amplified signal occurs.

8. Apparatus according to claim 4 in which the focusing means is a part of the optical system to be focused, and in which the adjusting means adjusts the focusing means in reciprocal axial movement, movement in each direction continuing until the amplified signal decreases from a maximum by a predetermined amount.

9. Apparatus according to claim 4 in which a first focusing means is adjusted repeatedly through a predetermined range of positions; and a second, similar focusing means which is part of said optical system is continually adjusted to the position corresponding to the maximim amplified signal in each repeated movement of the first focusing means.

10. Focusing apparatus for focusing an optical systm according to claim 4 wherein said adjusting means includes means responsive to an amplified signal component derived from the highest spatial frequency of said distribution to increase the proportion of high frequency components in the said electrical signal.

* * * * *